US008258068B2

(12) United States Patent
Citti et al.

(10) Patent No.: US 8,258,068 B2
(45) Date of Patent: Sep. 4, 2012

(54) SINTERED PRODUCT PRODUCED FROM A ZIRCON-BASED CHARGE

(75) Inventors: Olivier Citti, Wellesley, MA (US); Julien Fourcade, Shrewsbury, MA (US)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 103 days.

(21) Appl. No.: 12/936,043

(22) PCT Filed: Apr. 14, 2009

(86) PCT No.: PCT/FR2009/050686
§ 371 (c)(1),
(2), (4) Date: Nov. 19, 2010

(87) PCT Pub. No.: WO2009/138611
PCT Pub. Date: Nov. 19, 2009

(65) Prior Publication Data
US 2011/0107796 A1 May 12, 2011

(30) Foreign Application Priority Data

Apr. 15, 2008 (FR) ................................... 08 52534

(51) Int. Cl.
*C04B 35/482* (2006.01)
*C04B 35/484* (2006.01)
(52) U.S. Cl. ........................ 501/106; 501/107
(58) Field of Classification Search .................. 501/106, 501/107
See application file for complete search history.

(56) References Cited

U.S. PATENT DOCUMENTS

| 2,220,412 A | 11/1940 | Kinzie et al. |
| 3,899,341 A | 8/1975 | Schwarz |
| 5,124,287 A | 6/1992 | Wehrenberg et al. |
| 5,407,873 A | 4/1995 | Goerenz et al. |
| 2009/0215609 A1 | 8/2009 | Gaubil et al. |
| 2010/0089098 A1* | 4/2010 | Citti et al. ............... 65/374.13 |

FOREIGN PATENT DOCUMENTS

| EP | 0 952 125 A1 | 10/1999 |
| FR | 2 907 116 A1 | 4/2008 |
| JP | 04193766 * | 7/1992 |
| SU | 1020404 A | 5/1983 |
| WO | WO 02/44102 A1 | 6/2002 |
| WO | WO 2006/073841 A1 | 7/2006 |
| WO | WO 2006/108945 A1 | 10/2006 |
| WO | WO 2008/047298 A2 | 4/2008 |

OTHER PUBLICATIONS

International Search Report issued in Application No. PCT/FR2009/050686; Dated Mar. 15, 2010 (With Translation).

* cited by examiner

*Primary Examiner* — Karl Group
(74) *Attorney, Agent, or Firm* — Oliff & Berridge, PLC

(57) ABSTRACT

The present invention relates to a sintered product elaborated from a starting charge containing 75-99% of zircon, in mass percentage based on the oxides and having the following average weight chemical composition, in mass percentages based on the oxides $60\% \leq ZrO_2 \leq 72.8\%$, $27\% \leq SiO_2 \leq 36\%$, $0.1\% \leq B_2O_3 + GeO_2 + P_2O_5 + Sb_2O_3 + Nb_2O_5 + Ta_2O_5 + V_2O_5$, $0.1\% \leq ZnO + PbO + CdO$, $B_2O_3 + GeO_2 + P_2O_5 + Sb_2O_3 + Nb_2O_5 + Ta_2O_5 + V_2O_5 + ZnO + PbO + CdO \leq 5\%$, $0\% \leq Al_2O_3 + TiO_2 + MgO + Fe_2O_3 + NiO + MnO_2 + CoO + CuO \leq 5\%$, other oxides: $\leq 1.5\%$, for a total of 100%.
Notably used in a glass furnace.

17 Claims, No Drawings

SINTERED PRODUCT PRODUCED FROM A ZIRCON-BASED CHARGE

TECHNICAL FIELD

The invention relates to novel sintered materials produced from zircon, a method for their making and their use in a glass furnace.

TECHNOLOGICAL BACKGROUND

Among refractory products, a distinction is made between molten and cast products and sintered products.

Unlike sintered products, fused and cast products most often include a very abundant intergranular glassy phase which will fill the lattice of the crystallized grains. The problems encountered by sintered products and by fused and cast products in their respective applications, and the technical solutions adopted for solving them, are therefore generally different. Moreover, because of the significant differences between the making processes, a composition developed for making a fused and cast product cannot a priori be used as such for making a sintered product and vice versa.

Sintered products are obtained by mixing suitable raw materials and then shaping this mixture in the green state and baking the resulting green form at a sufficient temperature and during sufficient time in order to obtain sintering of this green form.

Sintered products depending on their chemical composition and their preparation method are intended for very diverse industries.

A sintered product adapted to a particular application will therefore not have a priori the properties required for it being used in another application where the temperature, corrosion or abrasion conditions are different.

For instance, U.S. Pat. No. 3,899,341 describes sintered products elaborated from zircon (50-90%) and from zirconia. The zirconia is partly stabilized in order to limit elastic deformations of the products, which lead to cracks. The products of U.S. Pat. No. 3,899,341 are however designed to be used in contact with molten steel. They are therefore not a priori suitable for being used in contact with molten glass.

Among the sintered products, the dense products elaborated from zircon (zirconium silicate: $ZrO_2.SiO_2$, or $ZrSiO_4$) and optionally zirconia (free zirconium oxide $ZrO_2$) may be used in applications where they are directly in contact with molten glass, in particular in the case of non-alkaline glasses.

EP 952 125 thus describes sintered products intended for glass furnaces and elaborated from zircon (5-40%) and from zirconia. These products further contain titanium, aluminium and yttrium oxides with which large blocks may be elaborated without any cracks. The $SiO_2$ content of these products is less than 14%. Their $ZrO_2$ content is larger than 82%.

WO 02/44102 describes isopipes used for making glass sheets. Isopipes include more than 95% by mass of zircon and exhibit insufficient creeping behavior, unless they also include between 0.2 and 0.4% of titanium oxide. In order to illustrate the state of the art, WO 02/44102 cites U.S. Pat. No. 5,124,287.

U.S. Pat. No. 5,124,287 describes compositions containing from 75 to 95% of zircon and of titanium oxide, intended to be in contact with molten glass. It indicates that the presence of titanium oxide is favorable for densifying the obtained products after sintering. In the final product, the zirconia should be non-stabilized and it is therefore preferable to use non-stabilized zirconia in the starting mixture. The use of stabilized zirconia, for example with stabilizers of zirconia such as yttrium or calcium oxides, is however not redhibitory, the heating of the mixture leading to destabilization of zirconia.

WO 2006/073841 describes refractory materials intended for the glass industry. These materials based on zircon, may include $Y_2O_3$. They always include at least 1% $P_2O_5$ or $V_2O_5$.

SU 1 020 404 describes a mixture intended for coating refractory products based on zircon.

The appearance of new glasses, such as alkali-free glasses, entails an increase in the melting and/or shaping temperatures for glass. Consequently, traditional materials based on zircon see their performances decrease. Indeed, traditional materials based on zircon tend to exudate when they are subject to temperatures above 1,550° C. Exudation is all the more significant since the temperature and the exposure time to these temperatures increase. This phenomenon is particularly damageable because it may then be accompanied by formation of defects in the glass, increased corrosion by the glass and by bubbling phenomena.

Therefore, there is a need for a product having very good resistance to exudation and which may be used in glass furnaces. The present invention is aimed at meeting this need.

SUMMARY OF THE INVENTION

For this purpose, the invention proposes a sintered product elaborated from a starting charge containing 75-99% zircon, in mass percentages on the basis of the starting charge, and having the following average weight chemical composition, in mass percentages based on the oxides:

$60\% \leq ZrO_2 \leq 72.8\%$, $27\% \leq SiO_2 \leq 36\%$, $0.1\% \leq B_2O_3+GeO_2+P_2O_5+Sb_2O_3+Nb_2O_5+Ta_2O_5+V_2O_5$, $0.1\% \leq ZnO+PbO+CdO$, $B_2O_3+GeO_2+P_2O_5+Sb_2O_3+Nb_2O_5+Ta_2O_5+V_2O_5+ZnO+PbO+CdO \leq 5\%$, $0\% \leq Al_2O_3+TiO_2+MgO+Fe_2O_3+NiO+MnO_2+CoO+CuO \leq 5\%$, other oxides: $\leq 1.5\%$, for a total of 100%.

This sintered refractory product has excellent resistance to exudation, in particular relatively to the products described to this day. Advantageously, it also has a high density, either equivalent or higher than that of tested known products.

Preferably, the product according to the invention further has one or more of the following optional characteristics:

The $Ta_2O_5$ content is larger than 0.3%, preferably larger than 0.5%, more preferably larger than 0.8%, in mass percentages based on the oxides.

The $Ta_2O_5$ content is less than 3%, preferably less than 2.5%, more preferably less than 2%, in mass percentages based on the oxides.

$0.1\% \leq GeO_2+P_2O_5+Nb_2O_5+Ta_2O_5$, and/or $0.1\% \leq ZnO$, and/or $GeO_2+P_2O_5+Nb_2O_5+Ta_2O_5+ZnO \leq 5\%$, and/or $0\% \leq Al_2O_3+TiO_2+MgO+Fe_2O_3+NiO+MnO_2+CoO+CuO \leq 5\%$, in mass percentages based on the oxides.

The ZnO content is larger than 0.3%, preferably larger than 0.5%, more preferably larger than 0.8%, in mass percentages based on the oxides.

The ZnO content is less than 3%, preferably less than 2.5%, more preferably less than 2%, in mass percentages based on the oxides.

The product according to the invention includes at least one oxide, and preferably at least two oxides, from $Al_2O_3$, $TiO_2$, MgO, $Fe_2O_3$, NiO, $MnO_2$, CoO and CuO. Preferably the content of at least one of these oxides, or even each of at least two of these oxides, is larger than 0.05%, preferably larger than 0.10%, more preferably larger than 0.15%, still preferably larger than 0.3%, in mass percentages based on the oxides. Preferably, $0.05\%<Al_2O_3+TiO_2$, preferably $0.9\%<Al_2O_3+TiO_2$, more preferably $1\%<Al_2O_3+TiO_2$. Also preferably, $Al_2O_3+TiO_2<3\%$, preferably $Al_2O_3+TiO_2<2\%$, in mass percentages based on the oxides.

The product has the following average weight chemical composition, in mass percentages based on the oxides:

$60\% \leq ZrO_2 \leq 72.4\%$, $27\% \leq SiO_2 \leq 36\%$, $0.2\% \leq B_2O_3+Nb_2O_5+Ta_2O_5 \leq 2.5\%$, $0.2\% \leq ZnO \leq 2.5\%$, $0.2\% \leq Al_2O_3+TiO_2+MgO+NiO+MnO_2+CoO+CuO \leq 3\%$, other oxides: $\leq 1.5\%$, for a total of 100%.

The product has the following average weight chemical composition, in mass percentages based on the oxides:

$60\% \leq ZrO_2 \leq 72.4\%$, $27\% \leq SiO_2 \leq 36\%$, $0.2\% \leq Nb_2O_5+Ta_2O_5 \leq 2.5\%$, $0.2\% \leq ZnO \leq 2.5\%$, $0.2\% \leq Al_2O_3+TiO_2 \leq 2\%$, other oxides: $\leq 1.5\%$, for a total of 100%.

The <<other oxides>> are impurities. Preferably, the content of <<other oxides>> is less than 1.2%, preferably less than 1%, more preferably less than 0.7%, preferably less than 0.5%, and still preferably less than 0.2%, in mass percentages based on the oxides.

The $P_2O_5$ content is less than 1%, preferably less than 0.5%.

The yttrium oxide $Y_2O_3$ content is less than 0.5%, preferably less than 0.3%, in mass percentages based on the oxides.

The zircon content in the starting charge is larger than or equal to 80%, in mass percentage based on the starting charge.

The zirconia content in the product is larger than 5%, preferably larger than 10%, and/or less than 15%, in mass percentages based on the oxides.

More than 90% by number, or even substantially 100% by number of the grains have a size less than 50 microns, preferably less than 30 microns, preferably less than 20 microns, even preferably less than 10 microns.

The apparent porosity of the product is less than 5%, preferably less than 2%, preferably less than 1%, preferably less than 0.5%.

The product has an apparent density larger than 4.0 g/cm$^3$, preferably larger than 4.1 g/cm$^3$, preferably larger than 4.2 g/cm$^3$.

The product has the shape of a block, preferably having a mass larger than 5 kg, preferably larger than 10 kg.

The invention also relates to a method for making a sintered product including the following steps:
 a) mixing raw materials in order to form a starting charge,
 b) shaping a green part from said starting charge,
 c) sintering said green part so as to obtain said sintered product, remarkable in that the starting charge is determined so that said product is according to the invention.

Preferably, a method according to the invention may further have one or more of the following optional characteristics:

In step a), zircon is added and optionally zirconia in amounts such that the total of the zircon and zirconia contents account for at least 95% of the starting charge, in mass percentage based on the starting charge.

One or more of the oxides $Al_2O_3$, $TiO_2$, MgO, $Fe_2O_3$, NiO, $MnO_2$, CoO, CuO, $B_2O_3$, $GeO_2$, $P_2O_5$, $Sb_2O_3$, $Nb_2O_5$, $Ta_2O_5$, $V_2O_5$, PbO, ZnO and CdO are voluntarily (i.e. systematically and methodically) added, in amounts guaranteeing that the sintered product obtained in step c) is according to the invention.

At least 50%, preferably at least 80%, preferably at least 90%, more preferably substantially 100%, by mass of the zinc is added as oxide ZnO.

The phosphoric acid content is less than 1%, preferably less than 0.8%, even preferably less than 0.5%.

The raw materials used in step a) have a median size ($D_{50}$) less than 50 μm, or even less than 40 μm, or even less than 20 μm, or even less than 5 μm, or even less than 4 μm.

The invention also relates to the use of a refractory product according to the invention, made or capable of having been made in accordance with a method according to the invention, in a glass furnace, in particular in areas of the furnace in contact with molten glass. The invention also relates to such a glass furnace.

DEFINITIONS

In the present description and according to custom, in the starting charge or in the product, the molecules of $ZrO_2$ which are not associated with $SiO_2$ molecules for forming zircon are called <<zirconia>>. In the same way, the molecules of $SiO_2$ which are not associated with $ZrO_2$ molecules for forming zircon are called <<silica>>. The $ZrO_2$ content of the product according to the invention corresponds to the $ZrO_2$ content of zircon and to zirconia. The $SiO_2$ content of the product according to the invention corresponds to the $SiO_2$ content of zircon and to silica.

In a chemical composition, the oxide contents relate to the overall contents for each of the corresponding chemical elements, expressed as the most stable oxide, according to the customary convention of the industry; sub-oxides and optionally nitrides, oxynitrides, carbides, oxicarbides, carbonitrides, or even metal species of the aforementioned elements are therefore included.

In the sums of mass contents of the oxides $Al_2O_3$, $TiO_2$, MgO, $Fe_2O_3$, NiO, $MnO_2$, CoO, CuO, $B_2O_3$, $GeO_2$, $P_2O_5$, $Sb_2O_3$, $Nb_2O_5$, $Ta_2O_5$, $V_2O_5$, PbO, ZnO and CdO, used for defining the chemical composition of the product, one or more of the mentioned oxides may be absent.

The raw materials containing zirconium oxide $ZrO_2$ also contain small amounts of $HfO_2$ (1.5%-2%). <<$ZrO_2$>> conventionally designates zirconium oxide $ZrO_2$ and these traces of $HfO_2$ introduced with $ZrO_2$.

Unless indicated otherwise, all the percentages are mass percentages based on the oxides. In particular, in the starting charge, the zircon percentage is expressed on the basis of the total mass of the starting charge.

By <<impurities>>, are meant unavoidable constituents, necessarily introduced into the raw materials or resulting from reactions with these constituents. In a particular embodiment, $P_2O_5$ is an impurity.

The <<median size>> $D_{50}$ of a set of particles is the size dividing the particles of this set into first and second populations equal in mass, these first and second populations only including particles having a size which is larger or smaller than the median size, respectively.

The size of a grain is its larger dimension when observed in a polished section.

DETAILED DESCRIPTION OF AN EMBODIMENT

The zircon may be provided by zircon sand or by a chamotte of dense products with strong zircon content.

According to the invention, it is absolutely necessary that the starting charge includes at least 75%, preferably at least 80% of zircon. The advantageous properties of the product according to the invention would indeed not be obtained if the amounts of $SiO_2$ and $ZrO_2$ brought by zircon according to the invention were provided as silica and zirconia.

Preferably, the total of the zircon and zirconia contents accounts for at least 95% of the starting charge.

Zirconia has significant dilatometric variations due to its crystallographic state transition at high temperature. In order to limit these dilatometric variations, in particular on large blocks, it is necessary to limit the zirconia content. The starting charge should therefore contain less than 25% of zirconia, which is ensured with a zircon content of at least 75%.

According to the invention, the presence of at least one oxide selected from $B_2O_3$, $GeO_2$, $P_2O_5$, $Sb_2O_3$, $Nb_2O_5$, $Ta_2O_5$, or $V_2O_5$, in particular $Ta_2O_5$ and $Nb_2O_5$, and still particularly $Ta_2O_5$, and simultaneously at least one oxide selected from ZnO, PbO, and CdO, in particular ZnO, improves the resistance to exudation of the refractory product based on zircon.

With the additions of at least one oxide selected from $Al_2O_3$, $TiO_2$, MgO, $Fe_2O_3$, NiO, $MnO_2$, CoO, CuO, it is possible, if necessary, to improve the density of the products according to the invention. These additions are therefore particularly advantageous in applications where the product is placed in a corrosive environment, and notably in contact with molten glass. The inventors have discovered that, in the products of the invention, and in particular in the products including $Ta_2O_5$, high density may however be obtained when these additions, and in particular of $Al_2O_3$ and of $TiO_2$, are limited to low contents, in particular less than 3%, less than 2%, or even less than 1%, or even less than 0.5%, in mass percentages based on the oxides.

Preferably, at least 1% silica is added to the starting charge so as to promote starting of the densification at lower temperatures than those required for densifying pure zircon.

The <<other oxides>> are oxides such as $Na_2O$ or $Y_2O_3$. The $Na_2O$ content (which promotes dissociation of zircon) should be minimized. Preferably, these oxides are impurities brought by the raw materials, and they are not required constituents but are only tolerated. At contents less than 1.5%, it is considered that the effect of these <<other oxides>> does not substantially change the obtained result.

Preferably, the content of each of the oxides $Na_2O$ and $Y_2O_3$ in the sintered product according to the invention is less than 0.5%, preferably less than 0.3%, more preferably less 0.15% in mass percentages based on the oxides.

Sintered refractory blocks may be made according to a method conventionally including steps a)-c). Optionally, this method includes prior to step a), a step for milling zircon sources and other raw materials. With this step, it is possible to attain conventional particle size characteristics required for good subsequent densification of the material. In particular, the thereby prepared powders may have a median size ($D_{50}$) less than 50 µm, or even less than 40 µm, or even less than 20 µm, or even less than 5 µm, or even less than 4 µm.

In step a), all the raw materials are dosed so that the mixture has the desired average weight chemical composition, and then mixed in the presence of deflocculant(s) and/or binder(s) conventionally used in the zircon sintering methods, for example phosphoric acid.

The mixture of raw materials may optionally be atomized before passing to step b).

In step b), the mixture is then shaped, for example by isostatic pressing, in order to form blocks of a desired size.

Other techniques such as slip-casting, uniaxial pressing, gel casting, vibrocasting or a combination of these techniques may be used.

In step c), the green part is sintered in air at atmospheric pressure and at a temperature comprised between 1,400° C. and 1,700° C., so as to form a dense refractory block.

Of course, the present invention is not limited to the embodiments described provided as illustrative and non-limiting examples.

EXAMPLES

The following non-limiting examples are given with the purpose of illustrating the invention.

In these examples, the following raw materials used have been selected, the given percentages being mass percentages:

Micronized zircon having the following average chemical analysis (by weight): $ZrO_2+HfO_2$: 66%, $SiO_2$: 33%, $Al_2O_3$: 0.3%, $P_2O_5$: 0.3%, $Fe_2O_3$: 0.07%, $TiO_2$: 0.08%, and less than 0.2% of other compounds such as $Y_2O_3$. The particles have a median size ($D_{50}$) of 2.5 µm.

A solution of phosphoric acid $H_3PO_4$ at 80%.

Zinc oxide containing more than 99% of ZnO, of which the median size ($D_{50}$) of the particles is about 3 µm.

Titanium oxide containing about 95% of $TiO_2$ and whereof the median size of particles is 2.3 µm.

Alumina, of which the median size of the particles is about 3 µm.

Germanium oxide containing about 99% of $GeO_2$ and of which the median size of the particles is about 3 µm.

Tantalum oxide containing about 99.85% of $Ta_2O_5$ and of which the size of the particles is less than 44 µm.

Sintered refractory blocks were made according to a method conventionally including the following steps:
  a) mixing the raw materials in order to form the starting charge,
  b) shaping a green part from said mixture,
  c) sintering said green part.

In step a), all the raw materials were dosed so that the mixture has the desired average weight chemical composition, and then mixed in the presence of sintering agents, deflocculants, and/or binders, conventionally used, for example phosphoric acid.

The mixture of the raw materials may optionally be atomized before passing to step a).

In step b), the mixture was then shaped by isostatic pressing in order to form cylindrical green parts with a diameter of 200 mm and a height about 200 mm.

In step c), the green parts were then sintered in air, at atmospheric pressure and at a sintering temperature of 1,600° C. with the plateau being maintained for 20 hrs.

In order to measure the exudation level, samples as bars of product with a square section with a side length of 25 mm and a height of 75 mm were taken and subjected to a heating at 1,700° C. for 24 hours. At the end of this period, the volume of the sample was measured. The volume of the sample after heating is called "Vm", the volume of the sample before heating "Vi" and the difference "Va" between both volumes (volume increase) Va=Vm−Vi. The ratio Va/Vi is called the <<exudation index>> noted as <<EI>> in Table 1.

The portions of the raw materials used (mass percentages) as well as the apparent porosity (in %), the density and the "EI" index of the obtained sintered products are given in Table 1.

TABLE 1

| | 1 | 2 | 3 | 4 | 5 | 6 (comparative) | 7 (comparative) |
|---|---|---|---|---|---|---|---|
| Zircon | 98.75 | 98.5 | 97 | 97.3 | 97.33 | 98.5 | 98.6 |
| ZnO | 0.25 | 0.5 | 2.5 | 2.5 | 2.5 | | |
| $H_3PO_4$ | | | | | 0.17 | | |
| $Al_2O_3$ | | | | | | 0.8 | 0.3 |
| $Ta_2O_5$ | 1 | 1 | 0.5 | | | | |
| $GeO_2$ | | | | 0.2 | | | |
| $TiO_2$ | | | | | | 0.7 | 1.1 |
| Apparent porosity | 4.14 | 4.71 | 0.12 | 0.79 | 1.23 | 0.29 | 0.25 |
| Apparent density ($g/cm^3$) | 4.11 | 4.10 | 4.31 | 4.28 | 4.28 | 4.32 | 4.39 |
| EI | 3% | 6% | 3% | 5% | 3% | 12% | 9% |

Table 1 clearly shows the very good resistance to exudation of the products according to the invention. The density of these products remains equivalent to that of the tested known products.

These products are therefore well adapted for being used in glass furnaces.

What is claimed is:

1. A sintered product elaborated from a starting charge containing 75-99% of zircon, in mass percentage based on the oxides and in which raw materials are powders having a median size of less than 5 µm, said sintered product having the following average weight chemical composition in mass percentages based on the oxides:

$60\% \leq ZrO_2 \leq 72.8\%$, $27\% \leq SiO_2 \leq 36\%$, $0.1\% \leq B_2O_3+GeO_2+P_2O_5+Sb_2O_3+Nb_2O_5+Ta_2O_5+V_2O_5$, $0.1\% \leq ZnO+PbO+CdO$, $B_2O_3+GeO_2+P_2O_5+Sb_2O_3+Nb_2O_5+Ta_2O_5+V_2O_5+ZnO+PbO+CdO \leq 5\%$ $0\% \leq Al_2O_3+TiO_2+MgO+Fe_2O_3+NiO+MnO_2+CoO+CuO \leq 5\%$, other oxides: $\leq 1.5\%$, for a total of 100%.

2. The sintered product according to claim 1, wherein $0.1\% \leq GeO_2+P_2O_5+Nb_2O_5+Ta_2O_5$, and/or $0.1\% \leq ZnO$, and/or $GeO_2+P_2O_5+Nb_2O_5+Ta_2O_5+ZnO \leq 5\%$.

3. The sintered product according to claim 1, wherein the $Ta_2O_5$ content is larger than 0.3% and less than 3%, in mass percentages based on the oxides.

4. The sintered product according to claim 1, wherein the $Ta_2O_5$ content is larger than 0.8%, in mass percentage based on the oxides.

5. The sintered product according to claim 1, wherein the ZnO content is larger than 0.3% and less than 3%, in mass percentages based on the oxides.

6. The sintered product according to claim 1, wherein the ZnO content is larger than 0.8%, in mass percentage based on the oxides.

7. The sintered product according to claim 1, including more than 0.05% of at least one oxide from $Al_2O_3$, $TiO_2$, MgO, $Fe_2O_3$, NiO, $MnO_2$, CoO and CuO, in mass percentage based on the oxides.

8. The sintered product according to claim 1, including more than 0.3% of at least two oxides from $Al_2O_3$, $TiO_2$, MgO, $Fe_2O_3$, NiO, $MnO_2$, CoO and CuO, in mass percentage based on the oxides.

9. The sintered product according to claim 1, having a chemical composition such that $0.05\% < Al_2O_3+TiO_2 < 3\%$, in mass percentage based on the oxides.

10. The sintered product according to claim 1, having a chemical composition such that $0.9\% < Al_2O_3+TiO_2$, in mass percentage based on the oxides.

11. The sintered product according to claim 1, having an average weight chemical composition, in mass percentages based on the oxides, such that:

$60\% \leq ZrO_2 \leq 72.4\%$, $27\% \leq SiO_2 \leq 36\%$, $0.2\% \leq B_2O_3+Nb_2O_5+Ta_2O_5 \leq 2.5\%$, $0.2\% \leq ZnO \leq 2.5\%$, $0.2\% \leq Al_2O_3+TiO_2+MgO+NiO+MnO_2+CoO+CuO \leq 3\%$, other oxides: $\leq 1.5\%$, for a total of 100%.

12. The sintered product according to claim 1, having an average weight chemical composition in mass percentages based on the oxides, such that:

$60\% \leq ZrO_2 \leq 72.4\%$, $27\% \leq SiO_2 \leq 36\%$, $0.2\% \leq Nb_2O_5+Ta_2O_5 \leq 2.5\%$, $0.2\% \leq ZnO \leq 2.5\%$, $0.2\% \leq Al_2O_3+TiO_2 \leq 2\%$, other oxides: $\leq 1.5\%$, for a total of 100%.

13. The sintered product according to claim 1, wherein the content of <<other oxides>> is less than 0.5%, in mass percentage based on the oxides.

14. The sintered product according to claim 1, wherein the yttrium oxide $Y_2O_3$ content is less than 0.5%, in mass percentage based on the oxides.

15. The sintered product according to claim 1, wherein the zircon content is larger than 5%, in mass percent based on the oxides.

16. A method of working with molten glass, comprising contacting the molten glass with the sintered product of claim 1 within a furnace configured for working with molten glass.

17. The method of claim 16, wherein the sintered product has a high resistance to exudation, which reduces the formation of defects in a glass product made from the molten glass.

* * * * *